US007418730B2

(12) United States Patent
Chu et al.

(10) Patent No.: US 7,418,730 B2
(45) Date of Patent: Aug. 26, 2008

(54) AUTOMATIC CLIENT RESPONSES TO WORM OR HACKER ATTACKS

(75) Inventors: Simon C. Chu, Chapel Hill, NC (US); Steven W. Hunter, Raleigh, NC (US); William Joseph Piazza, Holly Springs, NC (US); Gregory Brian Pruett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 10/321,091

(22) Filed: Dec. 17, 2002

(65) Prior Publication Data

US 2004/0117640 A1     Jun. 17, 2004

(51) Int. Cl.
*G06F 11/00* (2006.01)
(52) U.S. Cl. ............................. 726/22; 726/23; 714/43
(58) Field of Classification Search ............. 726/22, 726/23, 24, 25; 714/43; 395/186, 187.01
See application file for complete search history.

(56) References Cited

U.S. PATENT DOCUMENTS

| 5,440,723 | A |   | 8/1995  | Arnold et al. |        |
|-----------|---|---|---------|---------------|--------|
| 5,621,889 | A | * | 4/1997  | Lermuzeaux et al. | 726/22 |
| 5,919,258 | A | * | 7/1999  | Kayashima et al.  | 726/23 |
| 5,960,170 | A | * | 9/1999  | Chen et al.       | 714/38 |
| 5,987,610 | A | * | 11/1999 | Franczek et al.   | 726/24 |
| 5,991,881 | A | * | 11/1999 | Conklin et al.    | 726/22 |
| 6,134,664 | A |   | 10/2000 | Walker            |        |
| 6,311,274 | B1|   | 10/2001 | Day               |        |
| 6,397,335 | B1| * | 5/2002  | Franczek et al.   | 726/24 |
| 6,704,874 | B1| * | 3/2004  | Porras et al.     | 726/22 |

(Continued)

FOREIGN PATENT DOCUMENTS

JP          09-269930          10/1997

(Continued)

OTHER PUBLICATIONS

Real Time Detection and Disablement of Viruses in a Data Communications Network, IBM Technical Disclosure Bulletin, Apr. 1996, pp. 289-291, vol. 39, No. 04.

(Continued)

*Primary Examiner*—Emmanuel L Moise
*Assistant Examiner*—Techane J Gergiso
(74) *Attorney, Agent, or Firm*—H. Artoush Ohanian; Cynthia S. Byrd; Biggers & Ohanian, LLP

(57) ABSTRACT

A system in which a networked device automatically evaluates hacker attack notification information and, based thereon, selects and executes responses to the attack. The notification may include information such as the address of the infected system, identification of the specific worm, and a list of vulnerable applications and operating systems. The evaluation is based on factors including criticality and vulnerability of applications running on the system and connectivity of the device. A variety of automatic responses can be selected, including notification of network administration, shutdown of the device or services running on the device, updating and activation of anti-virus software, and selective handling of data sent from the address of the suspect network device. The selection of responses can occur automatically based on rules input during setup or by intervention of network administration.

7 Claims, 3 Drawing Sheets

U.S. PATENT DOCUMENTS

| | | | | |
|---|---|---|---|---|
| 6,873,988 | B2 * | 3/2005 | Herrmann et al. | 707/10 |
| 6,886,099 | B1 * | 4/2005 | Smithson et al. | 726/24 |
| 7,062,783 | B1 * | 6/2006 | Joiner | 726/23 |
| 7,086,089 | B2 * | 8/2006 | Hrastar et al. | 726/22 |
| 7,089,589 | B2 * | 8/2006 | Chefalas et al. | 726/22 |
| 7,127,743 | B1 * | 10/2006 | Khanolkar et al. | 726/23 |
| 7,159,149 | B2 * | 1/2007 | Spiegel et al. | 714/43 |
| 7,174,566 | B2 * | 2/2007 | Yadav | 726/26 |
| 7,203,962 | B1 * | 4/2007 | Moran | 726/23 |
| 7,219,239 | B1 * | 5/2007 | Njemanze et al. | 726/3 |
| 2002/0046275 | A1 * | 4/2002 | Crosbie et al. | 709/224 |
| 2002/0087882 | A1 * | 7/2002 | Schneier et al. | 713/201 |
| 2002/0099959 | A1 | 7/2002 | Redlich et al. | |
| 2002/0194490 | A1 * | 12/2002 | Halperin et al. | 713/200 |
| 2003/0084320 | A1 * | 5/2003 | Tarquini et al. | 713/200 |
| 2003/0084349 | A1 * | 5/2003 | Friedrichs et al. | 713/201 |
| 2003/0154399 | A1 * | 8/2003 | Zuk et al. | 713/201 |
| 2003/0204632 | A1 * | 10/2003 | Willebeek-LeMair et al. | 709/249 |
| 2004/0030913 | A1 * | 2/2004 | Liang et al. | 713/200 |
| 2004/0047356 | A1 * | 3/2004 | Bauer | 370/401 |
| 2004/0054925 | A1 * | 3/2004 | Etheridge et al. | 713/201 |

FOREIGN PATENT DOCUMENTS

| | | |
|---|---|---|
| JP | 11-327897 | 11/1999 |
| JP | 2001-154970 | 8/2001 |
| WO | WO 93/22723 A1 | 11/1993 |

OTHER PUBLICATIONS

Artificial Immunity for Personal Computers, IBM Technical Disclosure Bulletin, Jul. 1991, pp. 150-154, vol. 24, No. 2.

Johnny Shieh, Gerald McBrearty, Shawn Mullen, William Fiveash, Scott Carroll, System and Method for Alerting Computer Users of Digital Security, Dossier AUS920000323.

* cited by examiner

AUTOMATIC CLIENT RESPONSES TO WORM OR HACKER ATTACKS

BACKGROUND

1. Field of the Invention

The present invention is in the field of computing devices and more particularly in the field of protecting computing devices from worm or hacker attacks.

2. Background

Computing devices such as servers and desktops are often connected to local area networks, providing connectivity both to other individual computing devices on the network and to other networks or to the Internet. While such connectivity provides benefits in terms of the sharing of information and access to resources, it also makes each computing device vulnerable to attacks through the network by worms and hackers.

A worm attack is carried out by a form of virus software capable of propagating itself over a local area network by locating and exploiting vulnerable operating systems and applications on individual computing devices resident on the network. A hacker attack is similar except that it is usually a human operator directing the attack instead of software. In either case, the attack is propagated through the local area network.

Worm or hacker attacks may be detected by a plurality of methods. An example of such a method is a "honey pot," wherein a vulnerable device is intentionally located on the network to attract attacks and detect them. The capability to notify computing devices on a network of an attack also exists, either through intervention of the network administrator or by an automated notification system. After such a notification is received by an individual computing device on a local area network, it would be desirable to have a method wherein said device could automatically, without intervention of network operations, respond to the attack by taking actions which at least reduce the effects of the worm or hacker attack.

SUMMARY OF THE INVENTION

The problems identified above are addressed by a method of invoking automatic client responses to such worms and hacker attacks within a local area network. Once an individual device on a network has been notified of an attack, a management agent resident on the individual computing device evaluates the nature of the attack. The management agent then selects responses to the attack. The selected responses then execute, responding to the attack. By enabling the execution of an automatic response to an attack and eliminating the need for intervention by network operations to select a response, the time to respond to an attack is reduced. The method also allows for network administration intervention in selecting and executing responses. Through a quick response to an attack, the effect of the attack may be reduced.

BRIEF DESCRIPTION OF THE DRAWINGS

Other objects and advantages of the invention will become apparent upon reading the following detailed description and upon reference to the accompanying drawings in which like reference numerals indicate like elements.

DETAILED DESCRIPTION OF THE EMBODIMENTS

Figure 1:
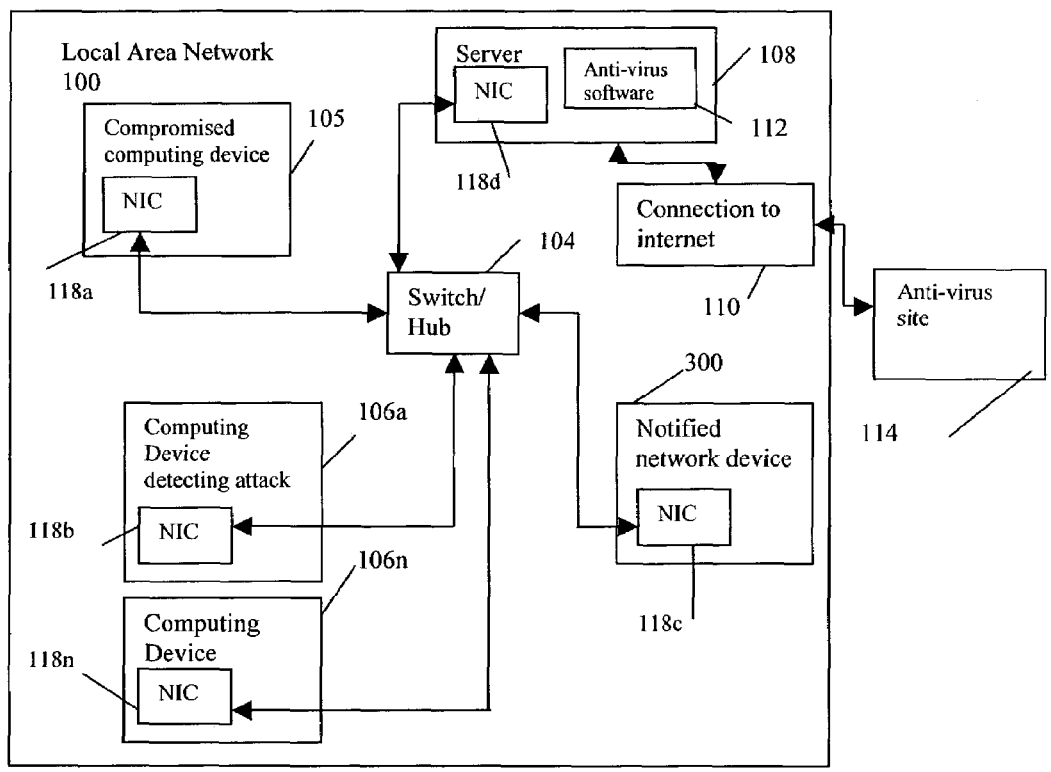
FIG. 1 depicts selected elements of a local area network comprising several individual computing devices of the type intended to be protected from the propagation of worm and hacker attacks.

Following is a detailed description of example embodiments of the invention depicted in the accompanying drawings. The example embodiments are in such detail as to clearly communicate the invention. However, the amount of detail offered is not intended to limit the anticipated variations or embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, the present invention contemplates a system and method by which a computing device resident on a local area network responds automatically to the notification of a worm or hacker attack. The local area network typically includes computing devices interconnected through network connection devices using a network medium such as cabling or wireless. Examples of network connection devices include hubs, which provide interconnections, and switches, which provide interconnections accompanied by some level of logical capability. The network may also include various other forms of infrastructure such as wireless links, additional hubs, additional switches, routers, and bridges.

The network also includes dedicated hardware, program code, or network administration oversight capable of detecting a worm and/or hacker attacks. Detection of an attack or intrusion can occur in a number of ways. For example:

when a worm or hacker probes a system on the network which it would have not legitimate reason to probe (e.g., an HTTP GET request directed to port 80 of a system that is not known to be a web server);

when anomalous statistical behavior of a system or network is detected;

when artifacts of an attack are found on a computing device (for example changed files);

when an attempt is made to access a "honey pot" (a computing device resident on the network which appears vulnerable to attack but serves no purpose on the network and would not normally be accessed).

For purposes of this disclosure, a worm is considered to be a form of virus software capable of propagating itself over a local area network by locating and exploiting vulnerable operating systems and applications on other systems. Databases of known worms are maintained and published by commercial anti-virus software services, allowing the identification of such worms through information on its specific pattern of attack and other signature actions. Hacker attacks are similar except that it is typically a human operator directing the attack instead of software.

Once an attack is detected, either by some automated method or by the network administrator, a notification can be sent to other computing devices resident on the network. Said notification may include information such as the IP address of the device suspected of being attacked, the identity of the worm software, and devices and applications which are vulnerable to attack. The present invention provides a method for automatically responding to the notification of an attack and pertains to actions taken after the receipt of a notification of attack by a computing device resident on a local area network.

Turning now to the drawings, FIG. 1 depicts selected elements of a local area network 100 of the type which may be attacked by a worm or hacker. At least some of the devices of network 100 are configured according to the present invention to take automated action upon determining that the network is being or has been attacked. FIG. 1 is provided to illustrate the environment in which the method of the present invention operates and is not intended to limit the invention to a specific network configuration. In the depicted embodiment, network 100 includes one or more computing devices including a compromised computing device 105 and one or more additional computing devices 106a through 106n. In addition, network 100 includes at least one computing device 300 configured to respond to notification of an attack according to one embodiment of the present invention. The various computing devices on network 100 are interconnected through an interconnection device 104, which may be a hub, a network switch, or other suitable interconnection device. The depicted embodiment of network 100 includes or has access to a server 108 upon which resides anti-virus software and definitions.

Each of the devices of network 100 is depicted as including a network device identified as a network interface controller (NIC) 118. NIC's 118 enable their host computing devices to communicate over the network. NIC's 118 typically implement some form of network protocol that defines the logical and physical or electrical structure of data that is exchanged between devices. In a common embodiment, NIC's 118 allow transmission of TCP/IP protocol over an Ethernet network. NIC's 118 may be implemented as adapters, which are dedicated printed circuit boards that connect to a motherboard or expansion card. In other embodiments, NIC's 118 may be integrated onto a system board or integrated within a processing device of the host computing device. While all NIC's 118 in FIG. 1 are indicated with a common reference numeral, NIC's 118 may vary in implementation.

Interconnection device 104 provides routing and interconnectivity for the network. Network 100 may also include various other forms of infrastructure such as wireless links, hubs, additional switches, routers, and bridges not shown in FIG. 1.

In the depicted embodiment of network 100, computing device 105 has been compromised by a worm or hacker attack. As its name implies, compromised device 105 contains some indication that it has been infected or otherwise compromised by a work or hacker attack and that the integrity of the device 105 may be considered compromised. Network 100 as depicted also includes one or more other computing devices 106a through 106n that contain program code or hardware capable of detecting an attack and sending a notification of attack to other devices on network 100. Computing device 300, which will be described in greater detail in FIG. 3, contains program code according to the present invention, which will invoke an automatic response to the presence of a worm or hacker attack.

FIG. 1 depicts an example wherein all the computing devices operative in the worm or hacker attack are separate computing devices on the network. In an actual network, elements of compromised device 105, detecting/notifying device(s) 106a through 106n, notified device 300, and server 108 may be incorporated into one or more actual computing devices resident on network 100. Thus, for example, the functionality to detect, notify, and respond to an attack may be included within one or more computing devices according to the specific implementation. The depicted embodiment, in which compromised system 105, detecting/notifying device(s) 106a through 106n, and notified device 300 are separated is intended to emphasize the various components of the overall network worm/hacker prevention method.

Figure 3:
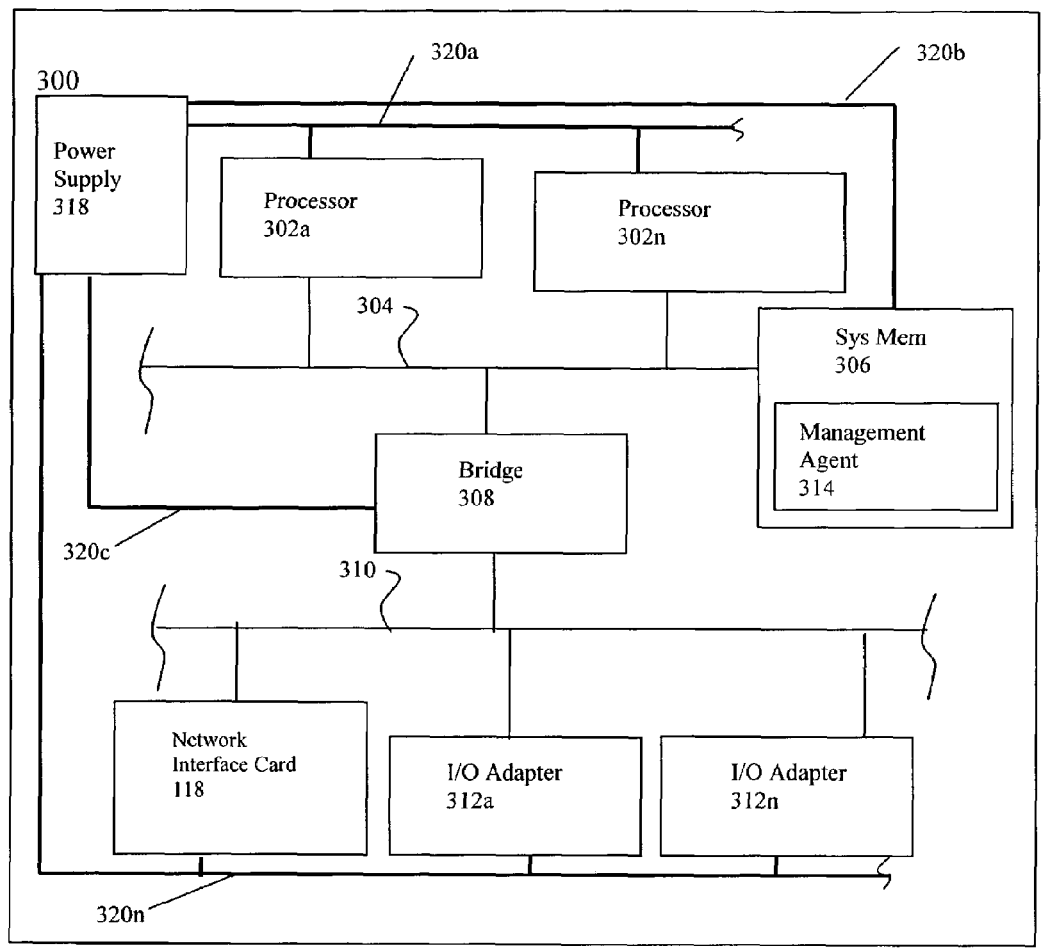
FIG. 3 is a block diagram of selected elements of a computing device suitable for executing the method of the present invention.

Turning to FIG. 3, a simplified block diagram of a computing device 300 suitable for executing the method of the present invention is presented. In the depicted embodiment, computing device 300 includes one or more processors 302a through 302n (generically or collectively referred to herein as processor(s) 302) connected to a system bus 304. A system memory 306 is accessible to processor(s) 302 via system bus 304. Each processor 302 may be implemented as a reduced instruction set (RISC) microprocessor such as the PowerPC® microprocessor from IBM Corporation. In another embodiment, processors 302 may comprise x86 compatible microprocessors such as Pentium® processors from Intel Corporation and Athlon® processors from Advanced Micro Devices. Typically, operating system software is installed on computing device 300 of network 100. Suitable operating system software may include a Unix based operating system such as the AIX® operating system from IBM, a non-Unix based operating system such as the Windows® family of operating systems from Microsoft, or a network operating system such as JavaOS® from Sun Microsystems.

In the depicted embodiment, computing device 300 includes a bus bridge 308 that couples system bus 304 to an I/O bus 310. Although only a single bus bridge 308 and a single I/O bus 310 are depicted, other embodiments of computing device 300 may include multiple bridges 308 and multiple I/O busses 310. I/O bus 310 may be implemented according to any of a variety of industry standardized I/O bus architectures including the industry standard architecture (ISA), the extended industry standard architecture (EISA), the peripheral components interface (PCI), and the advanced graphics peripheral (AGP) architecture, all as will be familiar to those in the field of microprocessor based computing systems.

The I/O bus 310 connects to a plurality of I/O adapters 312a through 312n. A specific example of an I/O adapter, a network interface card (NIC) 118, is depicted in FIG. 3. The NIC 118 provides the interconnection between the computing device 300 and the network 100 and is compatible with the I/O bus standard.

Computing device 300 also include a power supply 318 which translates electrical power from an externally provided voltage, an example of which of which is 120 V AC voltage supplied by a standard wall socket, to the voltages necessary for individual components of computing device 300. Taps, or connections within the power supply 318, provide power at the required voltages for the individual components, through a plurality of power interconnects 320a through 320n. Examples of such components are the processors 302 or the system memory 306. In a typical computing device, program code which controls the interaction of the power supply with the computing device components is resident in the system memory or within the power supply.

In the depicted embodiment the system memory 306 of computing device 300 includes management agent program code 314 that is executable by processor(s) 302 and suitable for responding to notification of an attack received from another computing device 106a on network 100 through network interface card (NIC) 118. Management agent 314 is configured to invoke an automatic response to the attack notification. IN one embodiment, computing device 300 executes a method 200, as described in greater detail below with respect to FIG. 2, using the management agent information and rules, evaluating the notification of attack, selecting responses, and executing said responses.

Responses such as a request to a server 108 which require access to the local area network 100 are processed through the network interconnection card (NIC) 118 that connects to the local area network. Intervention by network administration during the invocation of a response also occurs through NIC 118 and the connection to the local area network. The management agent 314 may also interact with power supply 318 to remove power from the entire device in an emergency shutdown of the device 300. Power supply 318 may comprise intelligent power handling capability which management agent 314 may access to remove power from selected components of the computing device 300 allowing for a selective shutdown of components. Responses such as the segregation of data from the compromised device may be invoked within the system memory 306.

Figure 2:
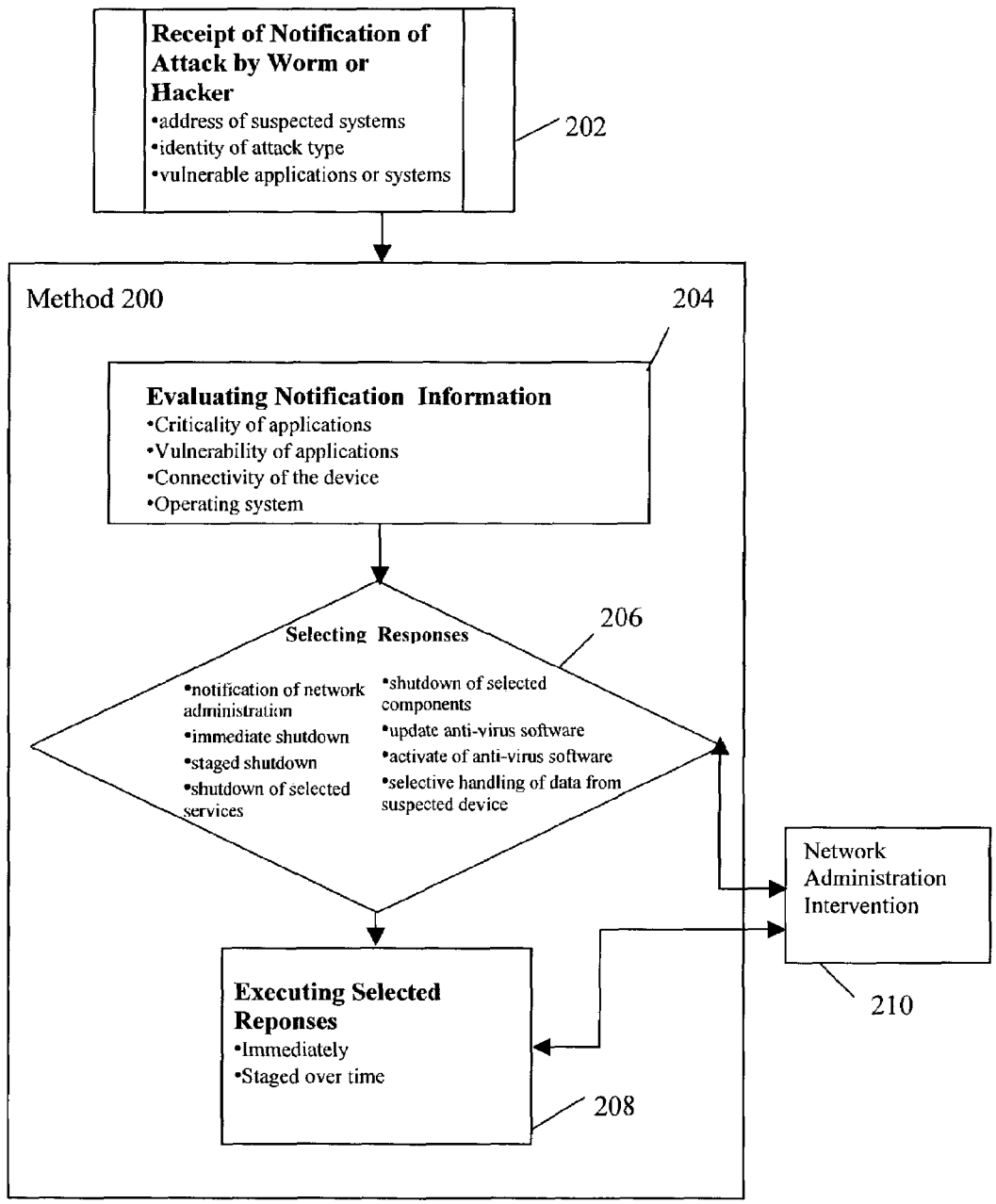
FIG. 2 is a flow diagram depicting an embodiment of a method for responding to a notification of a worm or hacker.

Turning now to FIG. 2 (in conjunction with FIG. 1), a flow diagram of a method 200 by which a computing device resident on a local area network such as network 100 responds to a notification of worm or hacker attacks is presented. As indicated previously, portions of the present invention may be implemented as a sequence or set of computer executable instructions (software code) stored on a computer readable medium. In such embodiments, the software code may be suitable for performing all or portions of method 200 as depicted in FIG. 2. In the depicted embodiment, method 200 is invoked in response to notification of an attack (block 202). The notification information may include various information indicative of or associated with a worm or hacker attack. This information may include, for example, one or more addresses of systems on the network suspected of being compromised by an attack, the identity of the specific worm software, and a list of vulnerable applications and operating systems.

Following the receipt of notification 202, a management agent 314 (FIG. 3) residing on computing device 300 (FIG. 3) executes various responsive actions. As depicted in FIG. 2, management agent 314 may first evaluate (block 204) the information contained in notification 202 to determine what action to take. This evaluation process may be influenced by factors such as the criticality of the applications running on device 300, the vulnerability of the applications running on the individual device to a given type of attack, the connectivity of the device to the network and other individual devices, and the operating system of device 300. If, for example, device 300 is running non-critical applications that are know to be susceptible to attack and device 300 is "highly" connected to other systems, the evaluation of these factors would typically conclude that device 300 should take the action most effective in preventing spreading of the worm. If, on the other hand, device 300 is running highly critical, but relatively secure applications and/or operating system software, the evaluation process may encourage no action at all or action that is less disruptive to network operation. The factors used to evaluate the notification information may be input by network administration during the set up of the management agent 314 and may be individualized to the function of the computing device 300 or the local area network.

Subsequent to evaluating the notification information 202, management agent 314 selects (block 206) an appropriate response to take. The selected response is influenced by the content of notification information and specifics of device 300 as evaluated by management agent 314 in block 204. In the depicted embodiment, the responses management agent 314 may take include notifying the network administration, immediately shutting down device 300, shutdown down device 300 in a staged or progressive manner, allowing device 300 to "fail gracefully," shutting down selected services running on device 300, shutting down selected components or peripherals of device 300, updating and/or activating anti-virus software, and selectively handling of data sent from any address of the network device identified as compromised. The response might also include a combination of the responses previously mentioned, for example, updating antivirus software and performing an antivirus scan while simultaneously rejecting data sent from the suspect device.

In the preferred embodiment of method 200, response selection 206 may be based upon rules and a hierarchy of responses input by network administration during the installation of the device or management agent or dynamically in response to network requirements. In another embodiment, response selection 206 may also be done by intervention of network administration.

The responses, individually or in combination, have the potential to slow the propagation of and damage done by a work or hacker attack. In a typical local area network, the slowing of an attack allows any failures that occur to the computing device to occur in a manner less injurious to the device or local area network than might otherwise be the case. The slowing of an attack has the additional benefit that it allows additional time for intervention by the network administration or the occurrence of automated responses by other computing devices resident on the network. While the injuries to an individual computing device maybe as severe as without said responses, by slowing the attack fewer systems will be involved and therefore fewer repairs (in the form of clearing virus remnants and re-installing software) will be required.

The updating of anti-virus software as a response may occur by an automated contact with a server 108 containing a library of anti-virus software 112 as depicted in FIG. 1. Such a request may trigger the downloading of the most current anti-virus software to the notified computing device 300. The response may also trigger a request by server 108 to a commercial anti-virus software service 114 available via an external network over the Internet, thereby enabling a download of anti-virus software to the server 108 and subsequently to the notified computing device 300.

The selective handling of data sent from a network address identified as compromised may include removing or deleting all data sent from the network address of the compromised device, quarantining all data sent from compromised network address; and/or filtering all data sent from the compromised network address. In one embodiment, management agent 314 automatically chooses the manner of selective handling of the data from the compromised network address. Alternatively, the manner of selective handling may be chosen by the network administrator.

Once management agent 314 has selected an appropriate response or set of responses, management agent 314 then executes (block 208) the selected responses to address the hacker attack. In one embodiment, executing the selected responses may occur immediately thereby providing a quick response to the attack. In an alternative embodiment, response execution 208 occurs in a timed manner based on rules input to the management agent at the time of installation. In yet another embodiment, executing the selected responses may occur at the direction of network administration. The method 200 offers flexibility in the execution of the responses that may be tailored to the function of the computing device 200 and the applications which it runs. There may be devices on the network, for example, that should not be shut down until a network administrator authorizes the shutdown.

In one embodiment suitable for its responsiveness, method 200 is invoked automatically by management agent 314, without network administration intervention, thereby enabling the fastest response time to the threat of worm of hacker attack. In an alternative embodiment, response selection 206 and response execution 208 occurs based on intervention of network administration. By allowing the intervention of network administration 210 a greater flexibility and intelligence may be brought to bear on the attack, although the speed of a completely automatic response is sacrificed.

It will be apparent to those skilled in the art having the benefit of this disclosure that the present invention contemplates a novel method to invoke an automatic response to a worm or hacker attack, allowing certain systems to avoid infection or damage completely and slow the spread of the infection to allow more time for other steps to be taken. An advantage of method 200 is that it does not require special network equipment, but uses typical existing network devices. Method 200 also does not require that any device in the network actually be infected, but permits a response based on only the suspicion of an attack. It is understood that the form of the invention shown and described in the detailed description and the drawings are to be taken merely as presently preferred examples. It is intended that the following claims be interpreted broadly to embrace all variations of the preferred embodiments disclosed.

What is claimed is:

1. A method of responding to a suspected attack of a computing device on a network, the method comprising:
   receiving notification information indicative of the suspected attack, wherein the notification information contains information including:
      at least one network address of a system on the network suspected of being compromised;
      an identification of specific software associated with the attack; and
      a list of vulnerable applications and operating systems;
   responsive to receiving the notification information indicative of the suspected attack, automatically evaluating the notification information, wherein evaluating the notification information is based on factors selected from the group of:
      a criticality of one or more vulnerable applications running on an evaluating device;
      vulnerability of the applications running on the individual device to the attack;
      connectivity of the device to the network and other individual devices; and
      the operating system of the individual network device;
   selecting at least one automatic client response for the network device based upon the evaluation, wherein the automatic client responses for the network device selected comprise actions selected from the group of:
      notifying network administration;
      immediately shutting down said device;
      shutting down said device in stages;
      shutting down selected services running on said device;
      updating of anti-virus software; and
      activation of anti-virus software;
   selective handling of data sent from an address associated with the network device identified as compromised, wherein the selective handling of data sent from the address of the network device identified as compromised is an action selected from:
      removing of all data sent from the address of the device identified as compromised;
      quarantining of all data sent from the address of the device identified as compromised;
      filtering of all data sent from the address of the device identified as compromised; and
   executing at least one of the selected responses to reduce consequences of the attack.

2. The method of claim 1, wherein the selection of responses occurs automatically based on rules input by network administration during a setup process.

3. The method of claim 1 wherein the selection of responses is performed by network administration interacting with the device.

4. The method of claim 1 wherein the updating of anti-virus software includes a request to another device on the network on which network anti-virus software resides for updating virus definitions.

5. The method of claim 1 wherein the updating of anti-virus software includes a request to a device outside of a local area network on which resides updated virus definitions and anti-virus software.

6. The method of claim 1, wherein executing of the selected responses occurs immediately upon selection.

7. The method of claim 1 wherein execution of the selected responses occurs at predetermined intervals of time.

* * * * *